May 30, 1961     E. W. ZEARFOSS, JR     2,986,013
REFRIGERATION
Filed Feb. 12, 1960     3 Sheets-Sheet 1

INVENTOR.
ELMER W. ZEARFOSS JR.
BY
Harry W. Hargis III
AGENT

May 30, 1961 E. W. ZEARFOSS, JR 2,986,013
REFRIGERATION
Filed Feb. 12, 1960 3 Sheets-Sheet 2

INVENTOR.
ELMER W. ZEARFOSS JR.
BY
Harry W. Hargis III
AGENT

May 30, 1961  E. W. ZEARFOSS, JR  2,986,013
REFRIGERATION

Filed Feb. 12, 1960  3 Sheets-Sheet 3

INVENTOR.
ELMER W. ZEARFOSS JR.
BY
Harry W. Hargis III

AGENT

United States Patent Office 2,986,013
Patented May 30, 1961

2,986,013
REFRIGERATION
Elmer W. Zearfoss, Jr., Philadelphia, Pa., assignor to Philco Corporation, Philadelphia, Pa., a corporation of Pennsylvania
Filed Feb. 12, 1960, Ser. No. 8,271
20 Claims. (Cl. 62—72)

This invention relates to refrigeration, and more particularly to a method of and apparatus for freezing and harvesting ice masses of the type commonly known as "cubes."

While of broader applicability, apparatus of this invention has particular utility in the field of household refrigerators.

In the art of automatically freezing and harvesting ice masses or cubes it has been the practice to resort to intricate systems comprising, for example, interconnected linkages, heating devices, and the like, for harvesting ice cubes by freezing them and causing them to be forcibly ejected from the mold means.

It is the primary objective of this invention to provide for simple and effective ice molding and harvesting, featured by a minimum of actuating linkages.

It is another object of the invention to provide ice mold and harvesting means wherein forces utilized in harvesting the ice masses are derived from accelerative movements of the mold means.

It is a specific objective of the invention to provide for harvesting of ice by storage of energy derived from centripetal acceleration of a mold containing a mass of water to be frozen therein, and then releasing such energy for use in ejecting the ice from the mold.

To the foregoing general ends the invention is featured by provision of a novel method for freezing and harvesting discrete masses of ice wherein the energy required for harvesting is derived from first acceleratively moving the mold while freezing the water, then deceleratively moving the mold after freezing of the water.

In its apparatus aspect, the invention contemplates, in a preferred embodiment thereof, provision of mold means including a plurality of flexible or otherwise deformable pockets disposed along the arc of a circle, the pockets having open portions presented radially inwardly toward means defining an axis about which the mold means is rotatable. Means is provided also for filling the mold pockets upon rotation of the latter, the centrifugal force of the water being effective to prevent the same from flowing out of the pockets. Means is provided for cooling the water as it is being rotated in the flexible pockets, and the mold means is movable between a distorted position and a rest position, in response, respectively to selective accelerative and decelerative movements thereof, thereby to provide for removal of the ice from the mold means.

For a complete understanding of the invention, and of the advantages inherent therein, reference may be had to the following description taken in light of the accompanying drawing, in which.

Figure 1:
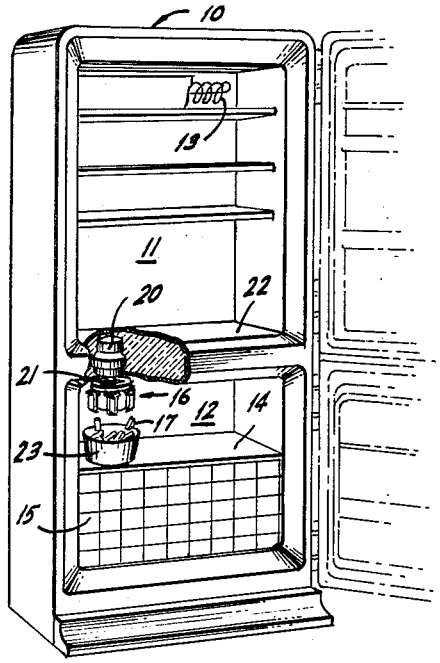
Figure 1 is a perspective showing of a domestic refrigerator embodying the invention.

Now making more particular reference to the drawings, and first to Figures 1 to 4 thereof, refrigerator cabinet 10, of conventional design, includes a food storage compartment 11 and a freezer compartment 12. A refrigerator evaporator having the form of a coil 13 is disposed in food compartment 11 to cool the latter, and refrigerated shelf means 14 is disposed in freezer compartment 12 to cool the latter to sub-freezing temperatures suitable for freezing ice cubes and foods, as well as for storage thereof.

Coil 13 and shelf means 14 may conveniently comprise the evaporator coil elements of a conventional refrigeration system, which need not be described in detail as respects the present invention. Foods to be frozen or stored may be positioned either upon shelf 14 or within basket 15.

Ice cubes, such as are seen at 17, are frozen, in particular accordance with the invention, in mold means 16 suspended upon a rotatable shaft 21 of a motor 20 mounted in insulative partition means 22 (Figure 1), the latter separating compartment 11 from compartment 12. A container 23 is disposed upon shelf 14, into which container ice cubes 17 will fall, to be stored therein, in accordance with principles of the invention hereinafter to be more fully explained.

Figure 2:
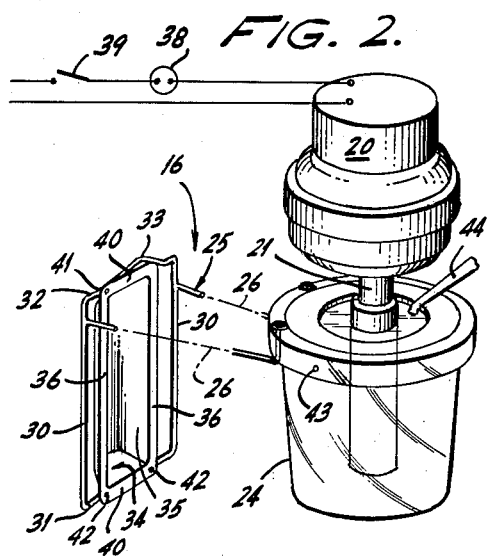
Figure 2 is a somewhat enlarged perspective showing, with parts removed, of ice making and harvesting apparatus seen in Figure 1.
Figure 3:
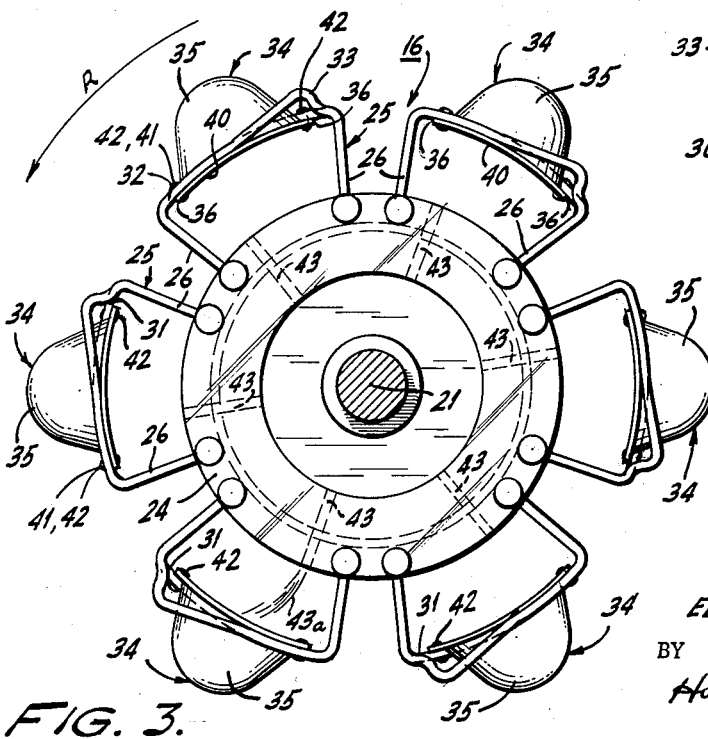
Figure 3 is a top plan view, partly in section, of ice making apparatus of the type seen in Figure 1.
Figure 4:
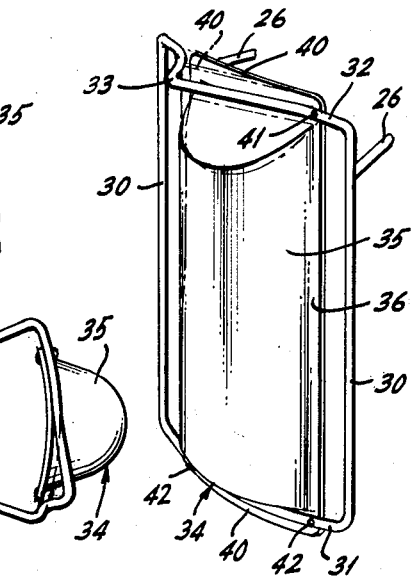
Figure 4 is a fragmentary view of apparatus seen in Figures 1, 2, and 3 and showing an operational feature of the invention.

Referring with still more particularity to Figures 2 to 4, ice mold apparatus 16 comprises an open top, cylindrical receptacle 24 mounted for rotatable movements, about its vertically extending axis, upon motor shaft 21. Spoke-like frames 25 are supported from receptacle 24 through the agency of horizontally extending spoke elements 26. Elements 26 include vertically extending, downwardly presented sections 30 having affixed thereto an upper rim 32 and a lower rim 31, each spaced from the other and concentric with motor shaft 21. While the lower rim 31 is generally continuous in its curvature, upper rims 32 each include offset, outwardly displaced segments 33. Ice mold sections 34 of flexible and resilient material, for example linear polyethylene, comprise an inwardly concave, vertically extending cylindrical portion 35 having peripheral side flanges 36 and upper and lower flanges 40. Each lower flange 40 is riveted, as seen at 42, to lower rim 31 in such manner that each mold is substantially restrained at its lower end. Upper flanges 40 are riveted, as seen at 41, to upper rims 32 in such a manner that one end of each upper flange 40 is restrained while the remainder of each such flange is movable toward and away from offset segments 33 of upper rims 32 (Figure 4), as will be hereinafter more fully explained as respects operation of the apparatus.

A plurality of radially presented bores or nozzles 43, one for each mold section 34, are disposed in the upper wall portion of receptacle 24 and communicate with the interior thereof. Each nozzle 43 is angled slightly, with respect to the vertical midplane of an associated mold section 34, in the direction of rotation of motor shaft 21, to compensate for "bending" of streams of fill water directed into the mold sections while the mold means is being centrifuged, as will be hereinafter described.

Apparatus for storing and metering water used to charge the mold may be of any known suitable type, the requirements of such apparatus being such that it provides at each filling of receptacle 24 sufficient water to fill each of the mold sections 34. No description of this apparatus will be undertaken other than to indicate somewhat diagrammatically (Figure 2), the provision of a fill pipe 44 positioned above the opening in receptacle 24. Also a timer, or other suitable control device, 38 disposed in series with line L may be preset to deenergize motor 20 upon completion of freezing of the ice, said motor being selectively energizable by switch 39.

In operation of the apparatus, receptacle 24 is filled to a predetermined level below nozzles 43, preferably while the motor is deenergized and the mold means at rest. The motor 20 is then energized, and—as it attains an intermediate, then a final speed, for example about 1660 r.p.m.—the water in receptacle 24 is centrifuged outwardly through nozzles 43—see the stream shown in broken lines at 43a—to impinge upon each of the mold sections 34, to fill the same. It will of course be understood that liquid to be frozen may desirably be introduced into receptacle 24 after rotation thereof has begun. As the mold sections fill, the upper flanges 40 are centrifuged outwardly, thereby distorting each flexible and resilient mold section as shown in broken lines in Figure 4, whereupon each upper flange comes to rest against offset segments 33 of upper rims 32. High speed rotation of the mold means continues until such time the water is frozen into cubes in each of the distorted sections 34.

During the freezing, energy derived from accelerative forces, that is, energy subsequently required to urge the molds against the surfaces of the ice masses frozen therein to release the same, is stored in the resilient mold sections by flexing of the latter through the action of the water centrifuged against inner surfaces of the mold sections and frozen in such position.

Following freezing of the cubes, rotation of the mold means is halted by deenergizing motor 20, whereupon the distorted resilient mold sections, in the absence of centrifugal force exerted thereon by the ice masses and by virtue of the mold sections' tendency to return to their original shapes, are flexed to their rest positions. In so flexing, forces are exerted against surfaces of the ice cubes 17 which are sufficient to release the same from the mold sections, and the cubes fall into the storage container 23 (Figure 1). The molds are then ready to be filled again and the freezing and harvesting process repeated until the desired quantity of cubes is obtained, as may be determined by known suitable measuring means.

Figure 5:
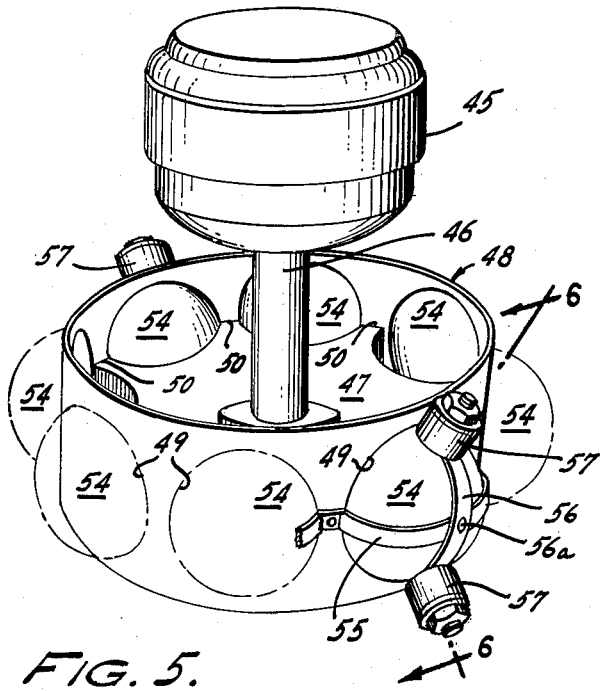
Figure 5 is a perspective showing of a modified embodiment of the invention.
Figure 6:
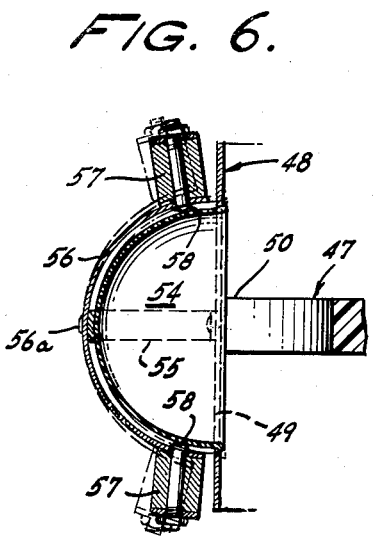
Figure 6 is a fragmentary showing, partly in section, looking in the direction of arrows 6—6 as applied to Figure 5, and also showing an operational feature of the modification.

Turning now to the modification of the invention illustrated in Figures 5 and 6, a motor 45 includes a downwardly presented vertically extending shaft 46, and a star-shaped wheel 47 is mounted upon the shaft for rotation therewith in a horizontal plane. A cylindrical, rim-like element 48 is disposed coaxially with motor shaft 46 and has a plurality of spaced openings 49 formed therein, the cylindrical element being supported by the extremities of the wheel, as seen at 50, at areas between openings 49. A flexible and resilient hollow mold cup 54 is disposed in each of the apertures in such manner that the concave sides of the cups are presented inwardly, toward shaft 46. While container means for holding the charge of water to be centrifuged into mold cups 54 is not shown in connection with this embodiment, it is understood that this construction may be the same as that illustrated in Figures 2 and 3. Means for flexing each of the mold cups in response to centrifuging of the same comprises a semicircular, horizontal frame element 55, only one of which is shown in Figure 5 in the interest of simplicity. A curved spring element 56 is supported by frame 55 at its center, as seen at 56a, and closely encircles a mold cup 54 in a vertical plane. A pair of weights is provided, each weight being disposed at an end of spring 56, as best seen in Figure 6, and the spring is so formed that in its rest position portions 58 thereof are urged against the cup slightly to distort the same.

In the operation of the embodiment illustrated in Figures 5 and 6 centrifuging of the mold and supply container (not shown), by energizing motor 45, causes water to be directed into the cups and centrifugally held therein. As cups 54 are filled each is distorted, in opposition to the combined resiliency of spring 56 and of the cup, to the broken line position shown in Figure 6, through the combined action of weights 57 and of the water. Centrifuging of the water continues in a below freezing environment, as is shown in Figure 1, until such time as the water within cups 54 is frozen, and motor 45 is deenergized. As the molds come to a halt, centrifugal force decreases whereby the weights 57 become ineffective and permit each spring 56 to move toward a rest position. In so doing, each spring 56 comes to bear, as at 58, against a mold cup 54, deflects the latter to a rest position, and thereby ejects the ice mass or cube from a mold cup. Each of the ice cubes then falls into a suitable container provided below the same, in accordance with the showing of Figure 1.

Figure 7:
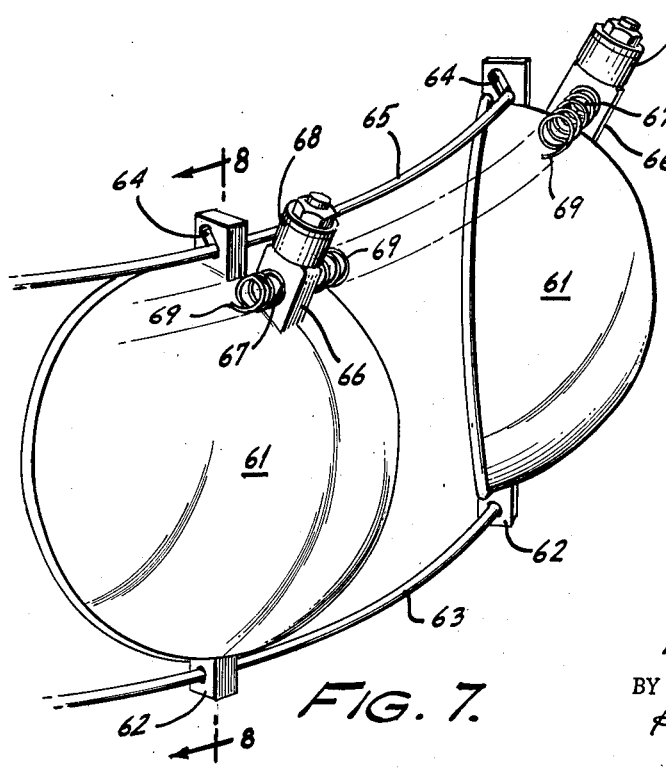
Figure 7 is a somewhat enlarged perspective showing, with parts removed, of another modified embodiment of the invention.
Figure 8:
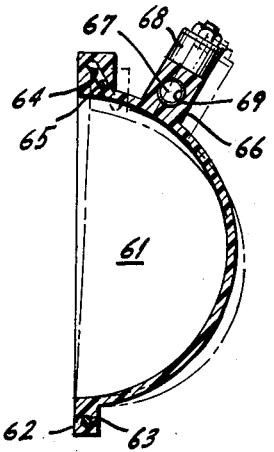
Figure 8 is a fragmentary showing, partly in section, looking in the direction of arrows 8—8 as applied to Figure 7, and illustrating an operational feature of this modification.

Still another embodiment of the invention as shown in Figures 7 and 8, wherein cup-like molds 61, similar to those seen in Figures 5 and 6, are pivotally mounted, as at 62, to a ring 63 at their lower portions and are slidably mounted, by means of a slot 64 to an upper ring 65. Each of the rings 63, 65 is circular and concentric with a centrifuging motor shaft (not shown). Each cup-like mold 61 includes a tab portion 66, provided with an opening 67, and having a weight 68 supported thereon. A coil spring 69 is threaded through each of the openings 67, as shown in Figure 7, and is so tensioned as to force the upper edges of the cups inwardly and to urge the lower ends of slots 64 against upper ring 65.

In the operation of this embodiment of the apparatus, centrifuging of the water filled molds 61 causes displacement of the upper parts of the molds in a path corresponding substantially with the direction of slots 64, as best seen in Figure 8, and against the resilience of the spring. Upon deenergizing the driving motor, centrifuging motion of the rotatable mold diminishes and forces of centripetal or deceleration are released from spring 69 which moves the molds back to their original, or rest, positions. Upon movement of molds 61 to their rest positions they are flexed, and ice frozen therein is ejected. As in the other embodiments, the ice masses fall by gravity into suitable receptacle means.

Figure 9:
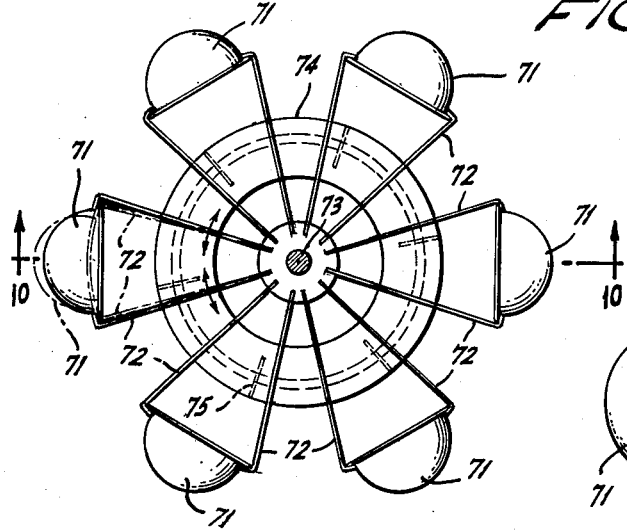
Figure 9 is a top plan view of still another modified embodiment of the invention.
Figure 10:
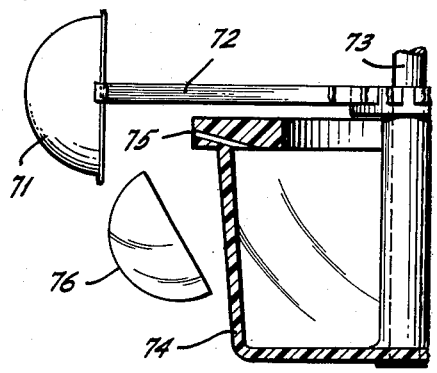
Figure 10 is a fragmentary showing, partly in section, looking in the direction of arrows 10—10 as applied to Figure 9, and illustrating operational features thereof.

In the embodiment of the invention illustrated in Figures 9 and 10, mold cups 71, similar to those illustrated in Figure 5, are supported at opposite rim portions thereof by leaf spring elements 72 adapted to bend toward and away from one another, as illustrated in broken lines in Figure 9. Bending of spring elements 72 is accompanied by movements of the aforementioned opposite rim portions of a mold cup toward and away from one another according to the direction of movement of the spring elements. The elements 72 extend radially from a vertically extending motor shaft 73. A cylindrical water container 74 is also supported by the shaft 73, for rotation therewith. Container 74 includes nozzle means 75, directed toward mold cups 71, to provide for filling the latter upon centrifuging of the container and cups by rotating shaft 73. As water filled mold cups 71 are centrifuged, the mass of the water and the cups causes the latter to flex to substantially the broken position shown in Figure 9. The water is frozen while the cups are flexed to this position against the forces of flexed spring elements 72. When the water is frozen, rotation of shaft 73 is halted, and spring elements 72, in the absence of forces thereon, return the mold cups to their original rest positions and eject the ice masses, one of which is seen falling, at 76, in Figure 10.

Figure 12:
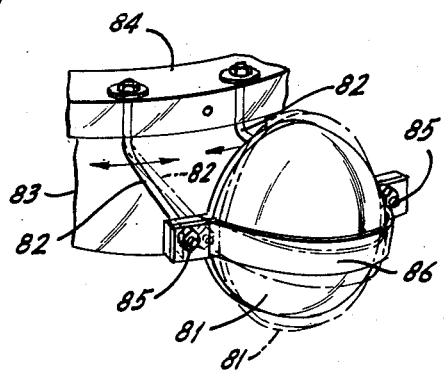
Figure 12 is a perspective showing, with parts broken away, of apparatus seen in Figure 11, and illustrating an operational feature thereof.
Figure 11:
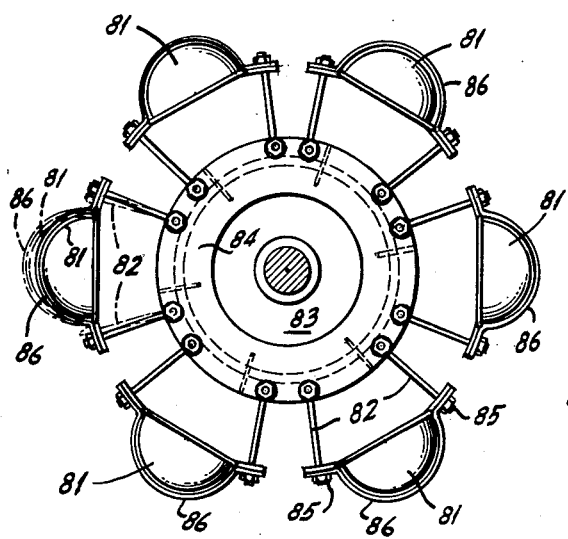
Figure 11 is a top plan view of an additional modified embodiment of the invention.

The final embodiment shown in Figures 11 and 12 is similar to the previously described embodiment in that distortion of the mold cups 81 is in the form of a side to side movement, as illustrated in the broken line showings of Figures 11 and 12. Distortion of the cup is accommodated by radially extending arms 82 pivotally mounted to flanged portion 84 of water container 83, the latter being similar to the one shown in Figure 10. Outer ends 85 of arms 82 are bridged by leaf spring elements 86 which apply the restorative, ice ejecting forces to distorted mold cups 81.

It is thus seen that the invention is characterized by unusual simplicity of construction and ease of operation, providing apparatus that is both simple and effective while requiring a minimum of actuating linkages.

While a number of embodiments have been shown, it will be understood that the invention is susceptible of other modifications within the scope of the appended claims.

I claim:

1. In the production of frozen masses, the steps comprising: rotating a flexible mold to centrifugally retain liquid introduced therein and to flex the mold from a first position to a second position; lowering the temperature of the liquid to freeze the same while the rotating mold is in said second position; and decelerating the rotating mold to provide for return thereof to said first position, and consequent freeing of the same from the mold.

2. In the production of frozen masses, the steps comprising: rotating a flexible mold to centrifugally retain liquid introduced therein and to flex the mold from a first position to a second position; lowering the temperature of the liquid to freeze the same while the rotating mold is in said second position; decelerating the rotating mold to provide for return thereof to said first position, and consequent freeing of the mass from the mold; and utilizing the force of gravity to strip the freed mass from said mold.

3. In the manufacture of ice masses, the steps comprising: introducing liquid to be frozen into a flexible and resilient mold, while rotating the mold in an environment maintained at sub-freezing temperature to hold the liquid therein and to flex the mold from its normal rest position to a position maintained during rotation of the mold and freezing of the liquid; and decelerating the rotating mold and frozen liquid to provide for resilient return of the mold to its normal rest position, and consequent freeing of the ice mass.

4. In the rapid production of small, discrete ice masses, the steps which comprise: introducing liquid to be frozen into a distortable mold; accelerating the mold along an arcuate path to distort the same and to hold the liquid within the mold during freezing thereof; and effecting deceleration of the mold to utilize forces derived from said acceleration and stored within the distorted mold to release ice masses from said mold.

5. In apparatus for freezing ice masses: a flexible and resilient mold adapted to contain a quantity of liquid to be frozen; means providing for rotation of the mold to flex the same from its normal rest position to a distorted position in which the mold has a configuration to which the liquid conforms during freezing thereof; and means for utilizing forces stored in the flexed mold during rotation thereof to release frozen liquid therefrom, said last means including provision for decelerating the mold to accommodate resilient return to its normal rest position.

6. Apparatus for use in the cyclic production of individual ice masses, comprising: a plurality of dished, resilient mold members disposed about a common axis and with the dished portions presented toward said axis; means for centrifuging said mold members with respect to said axis to hold water therein and to flex the same from a normal rest position to a distorted position in which they have a configuration to which water held therein conforms during the freezing operation; and means providing for deceleration of said mold members to release the forces stored within said members during the said centrifuging, and thereby to cause said members to return to their normal rest position stripping the frozen water therefrom.

7. Apparatus in accordance with claim 6, and further including water distributing means providing for filling of the mold members during centrifuging thereof, said means comprising a water reservoir having a plurality of nozzles leading therefrom, each nozzle being disposed and adapted to direct water into its respective mold member in response to centrifuging of said mold members.

8. Apparatus in accordance with claim 6, wherein each said resilient mold member has associated therewith resilient means responsive to centrifuging of said mold member to flex the same to its said distorted position.

9. Apparatus in accordance with claim 6, wherein each said resilient mold member has associated therewith resilient means disposed and adapted to flex said member to said normal rest position, weight means carried by said resilient means and responsive to centrifuging by said mold member to flex said resilient means thereby to accommodate flexing of said mold member to its said distorted position.

10. Apparatus in accordance with claim 6, wherein said mold members comprise cup means, each having rim portions disposed and adapted to move relative to one another to provide for movement of the mold members to their distorted position.

11. Apparatus in accordance with claim 6, wherein each said resilient mold member comprises a resilient mold cup, pivotally mounted at a rim portion thereof and slidably mounted at another rim portion thereof opposite the first recited rim portion, said cup being distortable responsive to such movement whereby sides of said cup are moved relatively toward one another, said apparatus further including resilient means interconnecting slidable portions of said mold cups and effective to urge the latter toward said normal rest positions, and weight means carried by each said mold cup responsive to centrifuging of said mold means to flex said resilient means thereby to accommodate flexing of said mold cups to said distorted position.

12. Apparatus in accordance with claim 6, wherein resilient means are disposed and adapted to support said mold members at opposite rim portions thereof to provide for distorting movements of such portions toward one another in response to centrifuging of said mold means.

13. Apparatus in accordance with claim 6, wherein pivotal arms are disposed and adapted to support said mold members at opposite rim portions thereof to provide for distorting movements of such portions toward one another, there being further provided resilient means to interconnect said rim portions and adapted to urge the latter apart.

14. Apparatus in accordance with claim 6, wherein said dished mold members are semicylindrical, each having a generally rectangular open portion, and said apparatus further includes means for supporting said mold members, each said member being rigidly supported at less than all corners of said rectangular open portion and non-rigidly supported at another corner thereof, said members being distortable by movement of a non-rigidly supported corner.

15. Ice freezing apparatus, comprising: flexible and resilient mold means for receiving and containing a discrete quantity of water to be frozen; means providing for accelerative movements of said mold means to hold water therein to be frozen and to flex said mold means from a rest position to a distorted position in which the mold means has a configuration to which the water conforms during freezing thereof, and means responsive to deceleration of said mold means and utilizing energy stored in said distorted mold means to eject ice therefrom.

16. In apparatus adapted to freeze ice masses: mold means including a plurality of flexible and resilient pockets disposed along the arc of a circle, said pockets having open portions presented radially inwardly toward means defining an axis about which said mold means is rotatable; means for filling said mold pockets, upon rotation of the latter, with liquid to be frozen, forces derived from centripetal acceleration of the liquid resulting in distorting of the flexible pockets to positions in which the freezing liquid conforms thereto; and ice release means driven with said mold means and operative by energy stored within said flexed mold means, in response to decelerative movements thereof.

17. A method for manufacturing discrete ice masses comprising the steps of: introducing liquid to be frozen into a flexible and resilient mold; subjecting the liquid and the mold to a slinging, throwing action effective to flex the mold from its rest position to a distorted position in which the liquid conforms to the mold; reducing the temperature of the liquid to freeze the same; and subjecting the mold and frozen liquid to lesser throwing action thereby to permit the former to flex to its rest position and release the ice mass.

18. In ice freezing apparatus: flexible and resilient mold means for containing a discrete quantity of liquid to be frozen; means for centrifuging said mold means thereby to flex said mold means from a rest position to a distorted position; means providing for introduction of liquid to be frozen into said mold means while the latter is being centrifuged and in said distorted position; and means operative to halt centrifuging of the mold means to accommodate flexing of the latter—by energy stored therein during the centrifuging—to its rest position to release ice therefrom.

19. Apparatus for use in the cyclic production of individual ice masses, comprising: a plurality of dished, mold members disposed to face inwardly toward a common generally vertical axis; means for subjecting said mold members to centripetal acceleration to hold liquid therein during a freezing operation; and means providing for deceleration of said mold members to accommodate harvesting of ice masses, the positions of the mold members being such that ice masses freed therefrom drop by gravity from said mold members.

20. Apparatus for use in the cyclic production of individual ice masses, comprising: a plurality of dished, mold members mounted for movements between one position in which liquid introduced therein is frozen and another position accommodating harvesting of masses of frozen liquid, said mold members being positioned to face inwardly toward a common generally vertical axis; means for centrifuging said mold members with respect to said axis to hold liquid therein and to provide for movement of the members to said one position in which liquid contained therein is frozen; and means providing for modifying the degree of centrifuging of said mold members to accommodate movement of said members to said other position to harvest said masses of frozen liquid, said other position of the mold members being such that frozen masses harvested therefrom drop by gravity from said mold members.

References Cited in the file of this patent
UNITED STATES PATENTS

| | | |
|---|---|---|
| 2,722,110 | Denzer | Nov. 1, 1955 |
| 2,729,070 | Ames | Jan. 3, 1956 |